July 7, 1931. A. L. BAUSMAN 1,813,872
COFFEE MAKING MACHINE
Filed April 18, 1929 7 Sheets-Sheet 2

INVENTOR.
Alonzo Linton Bausman
BY Chapin & Neal
ATTORNEYS.

July 7, 1931.  A. L. BAUSMAN  1,813,872
COFFEE MAKING MACHINE
Filed April 18, 1929   7 Sheets-Sheet 5

INVENTOR.
Alonzo Linton Bausman
BY
Chapin & Neal
ATTORNEYS.

July 7, 1931.  A. L. BAUSMAN  1,813,872
COFFEE MAKING MACHINE
Filed April 18, 1929   7 Sheets-Sheet 7

INVENTOR.
Alonzo Linton Bausman
BY Chapin & Neal
ATTORNEYS.

Patented July 7, 1931

1,813,872

UNITED STATES PATENT OFFICE

ALONZO LINTON BAUSMAN, OF SPRINGFIELD, MASSACHUSETTS

COFFEE MAKING MACHINE

Application filed April 18, 1929. Serial No. 356,141.

This invention relates to an automatic machine for making coffee, or any other extract beverage which is susceptible to manufacture by the means hereinafter disclosed.

This application is a continuation in part of my copending application for U. S. Letters Patent filed May 2, 1928, under Serial No. 274,613.

The general object of the invention is to provide an automatic coffee making machine suitable for use in restaurants and like places. The machine is so constructed that the coffee supply, when the machine is in operation, is large but when the machine is at rest, the supply of made coffee stored for delivery is small. This feature is desirable in a machine for use in restaurants where, during certain periods of the day, there is a large demand for coffee and, during other periods of the day, there is a small demand. The coffee will be in better condition if it is freshly made, according to the demand. The normal use of my machine will supply freshly made coffee in either large or small quantities, according to the demand.

The above, and various other features of the invention, by means of which it is particularly useful and adapted for the stated purpose and other purposes incidental to coffee making machines, will be apparent from the following description and will be pointed out in the appended claims.

The invention will be disclosed with reference to the accompanying drawings, in which:—

Figures 1, 2, 3, 4, 5:
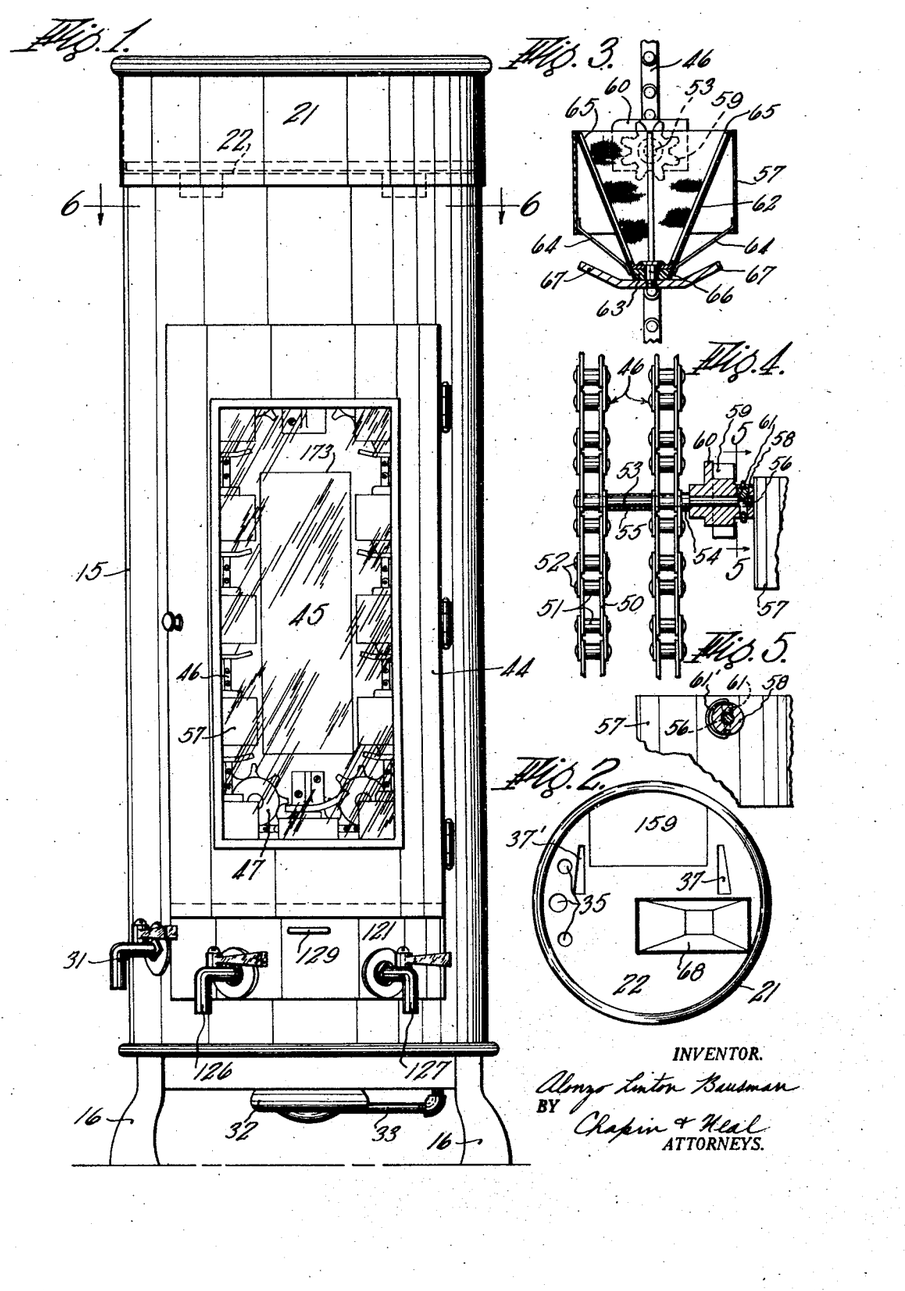
Fig. 1 is a front elevational view of a coffee making machine embodying my invention.
Fig. 2 is a small scale plan view thereof.
Fig. 3 is a sectional elevational view of one of the coffee cups.
Fig. 4 is a side elevational view illustrative of the mounting of the coffee cups on their conveyer.
Fig. 5 is a sectional view taken on the line 5—5 of Fig. 4.
Figure 6:
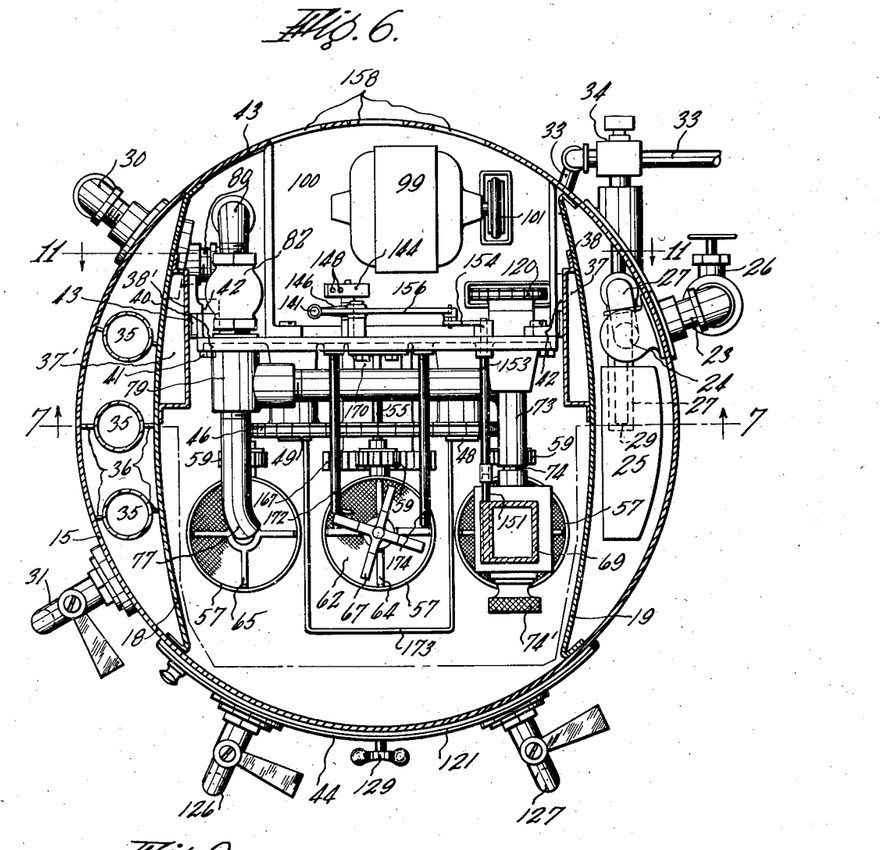
Fig. 6 is a sectional plan view taken on the line 6—6 of Fig. 1.
Figure 7:
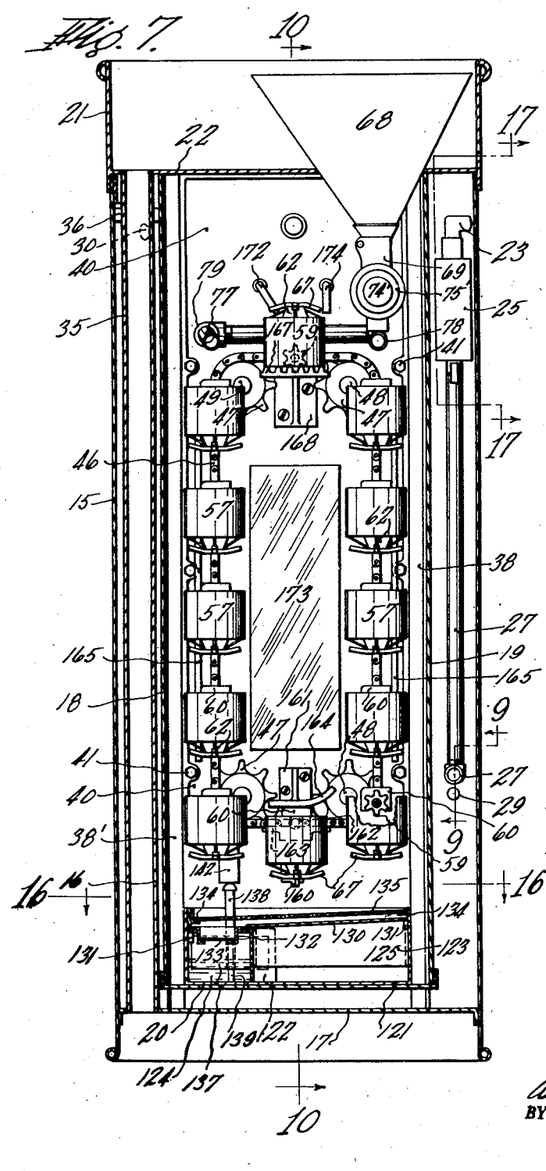
Fig. 7 is a sectional elevational view taken on the line 7—7 of Fig. 6.
Figure 9:
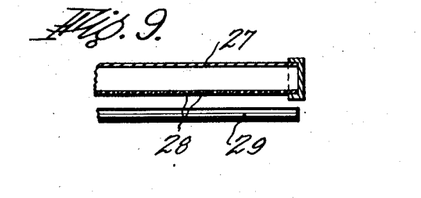
Fig. 9 is a sectional view taken on the line 9—9 of Fig. 7.
Figure 16:
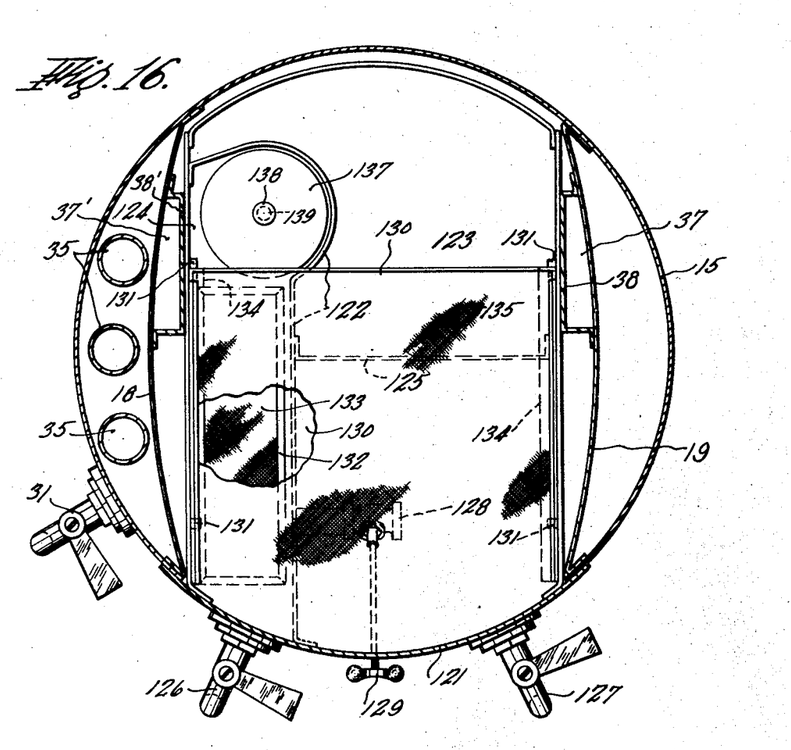
Fig. 16 is a sectional plan view taken on the line 16—16 of Fig. 7.
Figure 17:
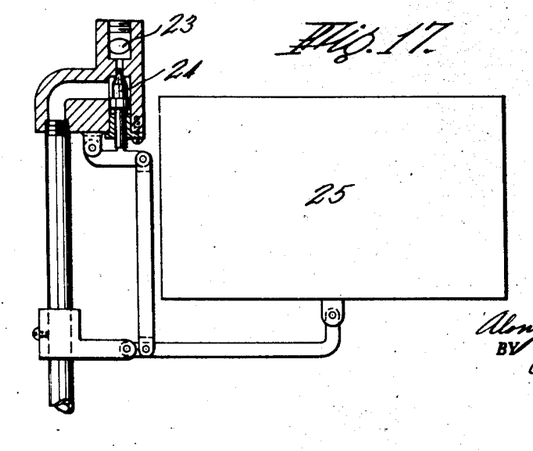
Fig. 17 is a detail view taken on the line 17—17 of Fig. 7.

Referring to these drawings; the machine includes an upstanding cylindrical tank 15, supported by legs 16 (Fig. 1). This tank (Fig. 7) is closed at its lower end by a head 17 suitably secured, as by soldering, to the tank. The interior of tank 15 is divided off by vertical partitions 18 and 19 and by a horizontal partition 20 to form a substantially U-shaped water storage chamber. The partitions 18 and 19 are suitably secured, as by soldering, along their vertical edges to the peripheral wall of tank 15 (Figs. 6 and 16) and the partition 20 is similarly secured to the lower horizontal edges of partitions 18 and 19 (Fig. 7). Surmounting tank 15 is a removable hood 21 having a head 22 which closes off the upper end of each vertical leg of the water chamber. Communicating with one vertical leg of this chamber, near the upper end thereof, is a water supply pipe 23 which is normally controlled by a valve 24, operated by a float 25 in a manner clearly obvious from Fig. 17. There is, however, preferably provided in pipe 23 a hand valve 26. The water admitted by valve 24 passes through a pipe 27. which extends downwardly a substantial distance in the water chamber and then turns forwardly and horizontally, terminating with a closed end. Water passes from this horizontal branch of pipe 27 (Fig. 9) through a series of holes 28 in its lower side and discharges over the sensitive element 29 of a thermostat. An overflow pipe 30 (Figs. 6 and 7) communicates with the other vertical leg of the water chamber, carries off the steam therefrom and forms a safeguard to prevent the water rising beyond the desired level,—such level being normally controlled, however, by the float operated valve 24. A draw off valve 31 is provided near the lower end of the water chamber.

The water may be heated by any suitable means. As shown in Fig. 1, a gas burner 32 is provided below the base of tank 15, and connected by a pipe 33 to the gas supply. Interposed in this pipe is a valve, shown conventionally at 34 in Fig. 6, which is operated by the thermostat 29. This thermostatically operated valve is of a known type and it is not deemed necessary to describe or illustrate it in detail. Suffice it to say, that it functions to turn on the gas whenever the water in the water chamber falls below a predetermined temperature and to shut off the gas when such water reaches such temperature.

The gases from the burner are carried off by a series of flues which pass through, or adjacent to the vertical legs of the water chamber, whereby some of the heat of the gases is utilized to heat the water. These flues for one side of the chamber consist of three pipes 35 (Fig. 6) which at their lower ends pass through and are suitably secured to the lower head 17 of the tank (Fig. 7). Near their upper ends, they are secured by stays 36 (Fig. 6), soldered to the pipes and to the wall of tank 15 or the partition 18. On the other side of the water chamber, a more or less rectangular shaped flue 37 is formed by securing to the outer side of partition 19, a metal strip 38. The head 22, above described, has openings therein which register with those of the several flues 35 and 37, as indicated in Fig. 2 so that through passages from the base to the top of tank 15 are provided for the escape of gases from the burner. If necessary or desirable a second flue 37′, similar to flue 37, may be provided by attaching a strip 38′ to the partition 18.

The space between the partitions 18 and 19 and above the partition 20 forms a compartment for the reception of the coffee making mechanism. Such space is divided off by a vertical plate 40 (Figs. 6 and 7). This plate serves to support substantially all of the mechanism of the machine (Figs. 10, 11 and 12), such as the coffee cup conveyer, the coffee feeding and measuring device, the hot water dispensing pipes, the coffee cup inverting means, and the means for operating the stirrers in the coffee cups, together with driving mechanism to coordinate the operation of the conveyer, coffee feeder and water dispensers. Plate 40 is secured by bolts 41 (Figs. 7 and 10) along each side edge to strips 42 (Figs. 6 and 10), which are secured one to the flue forming strip 38 on the partition 19 and the other to a similar strip 38′ on the partition 18. The space in back of plate 40 is closed off at the bottom by a pan 43 (Fig. 12), which closely fits against the plate 40, partitions 18 and 19 and tank 15 and is suitably secured thereto. By removing the bolts 41 and disconnecting the hot water supply pipe, later to be described, the plate 40 and all the mechanism carried thereby, may be removed from tank 15 as one unit. Access to the interior of the tank for the removal of such bolts and for other purposes may be had by opening the hinged door 44 (Fig. 1), usually provided with a window 45 through which the operation of the machine may be observed.

The coffee cup conveyer is located in front of plate 40 (Figs. 6, 7, 10 and 12). It consists of two socket chains 46 mounted side by side in axially spaced relation on a series of double sprocket wheels 47. There are four such sprocket wheels which guide the chains in a closed loop path of substantially rectangular form. The two vertical stretches of the conveyer are relatively long and the two horizontal stretches are relatively short. Three of the sprocket wheels are mounted to turn on studs 48, secured to plate 40, while the fourth is fixed to a shaft 49 which is rotatably mounted in plate 40 and from which the conveyer is driven. The two chains 46 (Fig. 4) are of the roller chain type having side plates 50, rolls 51 between such plates and pins 52 passing through the rolls and secured at their ends to the side plates. At intervals the standard pins 52 are removed and special pins 53 are substituted therefor. Each such pin passes through the side plates and roll of the front chain, across to the rear chain and then through the side plates and roll of the rear chain, with its end headed over against the rear side plate of the rear chain in the usual way. A flange 54 on each pin 53 abuts the front side plate of the front chain. A spacing sleeve 55 is mounted on each pin 53 and is interposed between the rear side plate of the front chain and the front side plate of the rear chain. Each pin 53 projects forwardly a substantial distance from the front chain and near its forward end has a groove 56.

A coffee cup is mounted for convenient removal on each of the pins 53. Each such cup includes a cylindrical shell 57 (Fig. 3) open at top and bottom. Secured thereto near the upper end thereof is the hub 58 of a gear 59, to the rear face of which is fixed a rectangular plate 60. This plate, gear and hub are bored out to receive pin 53 and to freely turn thereon. A pin 61 mounted in hub 58 engages in the groove 56 of pin 53 and is yieldably held thus positioned by a spring 61' (Fig. 5). By a slight outward pull, the shell 57 with attached hub, plate and gear can be withdrawn axially from its pin 53. Within shell 57 is screen 62, of frusto-conical shape, secured at its upper end to the upper end of shell 57 and at its lower end to a hub 63, secured by spider arms 64 to shell 57. A plurality of stirrer arms 65 engage the inner wall of screen 62. They radiate from, and are fixed to, a common shaft 66 rotatably mounted in hub 63. Below this hub and secured to shaft 66 is a wheel having four radiating spokes 67 (Fig. 6), which are adapted at suitable points in the travel of the conveyer to be engaged and turned to operate the stirrers 65 and loosen the ground coffee bean contained in the cup-like screens 62.

A measured charge of ground coffee bean is fed to each cup at some suitable point in the travel of the cup conveyer. Where, as is preferred, coffee is made during both vertical stretches of the conveyer, it is desirable to feed the ground coffee bean to the cups at the start of the downward travel thereof. If, however, coffee is to be made during only one vertical stretch of the conveyer, and this is within the scope of my invention, the ground coffee bean may perhaps be fed to the cups at some other point. The feeder comprises a hopper 68 (Fig. 7) which is set into an opening in the head 22. Interposed in the outlet pipe 69 of this hopper (Fig. 13) is a rotatable wheel 70 having a pocket 71 (see also Fig. 14). This pocket at one point in the revolution of the wheel becomes filled with ground coffee bean and at another point in its revolution discharges the measured charge into the lower and outlet end of pipe 69, from whence it falls into an underlying screen cup 62. The measuring wheel 70 (Fig. 10) is driven by a shaft 72, rotatably mounted in a hub on plate 40. The rear end of this shaft carries a sprocket which abuts the hub and is driven by mechanism later to be described. Fixed to the front end of shaft 72 is a sleeve 73, which also abuts said hub and with the sprocket holds shaft 72 against axial displacement. Sleeve 73 extends beyond shaft 72 (Fig. 14) far enough to receive the shaft 74 of the measuring wheel. Shaft 74 has a radially projecting pin 75 and sleeve 73 has a bayonet slot 76 (Fig. 10) whereby the shafts 72 and 74 are coupled in a manner to permit convenient detachment when the feeding and measuring wheel is to be removed. To remove this wheel it is simply necessary to turn it slightly by means of the knurled knob 74' and then to pull axially outwards on the knob, whereby the wheel, its shaft and the disc-like bearings 75' thereof may be withdrawn from casing 69.

Provisions are made for discharging hot water into the cups at two points in their travel, although in some cases it will suffice to have the hot water discharge at only one point. Dispensing spouts 77 and 78 (Fig. 7) are connected to a common hollow hub 79 on plate 40 and their outlets are so disposed as to discharge hot water into the uppermost cup of both vertical stretches of the conveyer (see also Figs. 10 and 12). From such cups, the water passes downwardly and successively through all the underlying cups of each vertical series. Hot water is supplied to the hollow hub 79 by piping 80 (Figs. 6 and 12), which extends first toward the back wall of tank 15, thence downwardly and thence forwardly, being connected to the left hand vertical leg of the hot water storage chamber at a point about half way down. By so doing, an even flow of hot water is secured because the water, at the level from which it is taken, is free from ebullition. Piping 80 includes a union 81 (Fig. 12) which permits the hot water supply connection to be conveniently broken when it is desired to remove plate 40. The dispensing spouts and the highest point in piping 80 are, of course, located at a level below that of the water in the storage chamber. Such piping also includes a valve 82 (Figs. 11 and 12), of the type having a sliding plunger 83. When this plunger is in the illustrated position, valve 82 is closed and when lowered, the valve will open and allow hot water to flow from both of the dispensing spouts into the underlying cups.

The valve plunger 83 is operated intermittently by a crank 85 mounted to turn on a stud 86, fixed to plate 40. Crank 85 is connected by a link 87 to a rod 88, mounted to slide vertically in bearings 89 and 89' fixed to plate 40. The construction of bearing 89' will best be understood from Fig. 12a. Rod 88 has fixed thereon a fork 90 which straddles the plunger 83. Resting on fork 90 and slidable on plunger 83 is a seat 91 for a spring 92. Fixed to plunger 84 is an adjustable abutment, such as a flanged nut 93, against which the upper end of spring 92 bears. Screws 95, passing loosely through the flange of nut 93, are threaded at their lower ends into seat 91 and serve to limit the extent of expansion of spring 92. When rod 88 is in its uppermost position as shown, spring 92 is compressed to some degree, whereby the valve 82 is held tightly closed. This spring also enables rod 88 to travel to some degree, after it has effected the closing of the valve, and thereby avoids the necessity for close adjustment of the stroke of rod 88 to the stroke of plunger 83, which would otherwise be required. For similar reasons, the lowering movement of plunger 83 is effected through the intermediary of a spring 96, which acts between an adjustable abutment 97 on the plunger and a spring seat 98 and which is adapted to be engaged by the lower face of fork 90.

Figure 10:
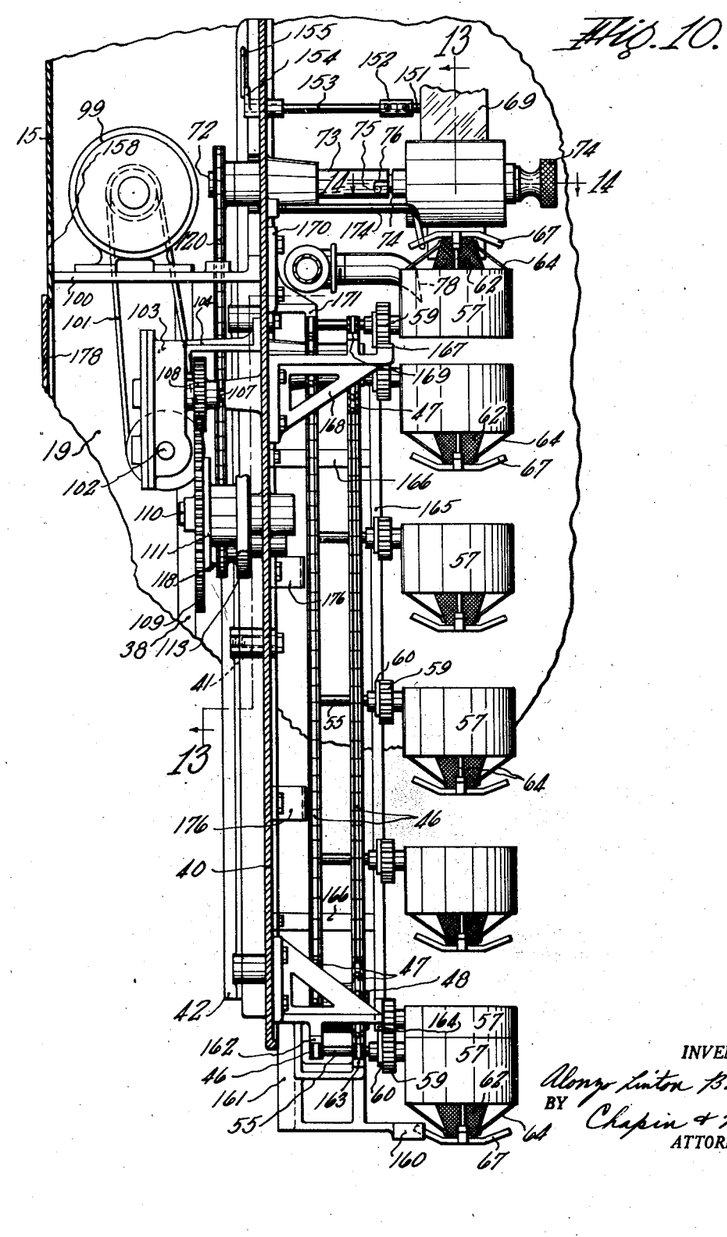
Fig. 10 is a fragmentary cross sectional view taken on the line 10—10 of Fig. 7.
Figure 11:
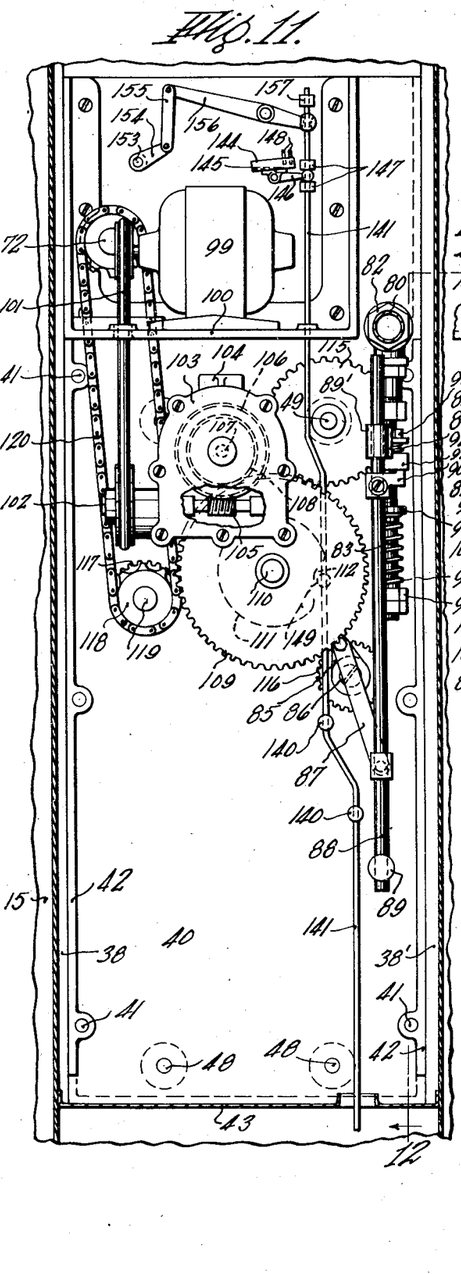
Fig. 11 is a fragmentary sectional view taken on the line 11—11 of Fig. 6.
Figure 12:
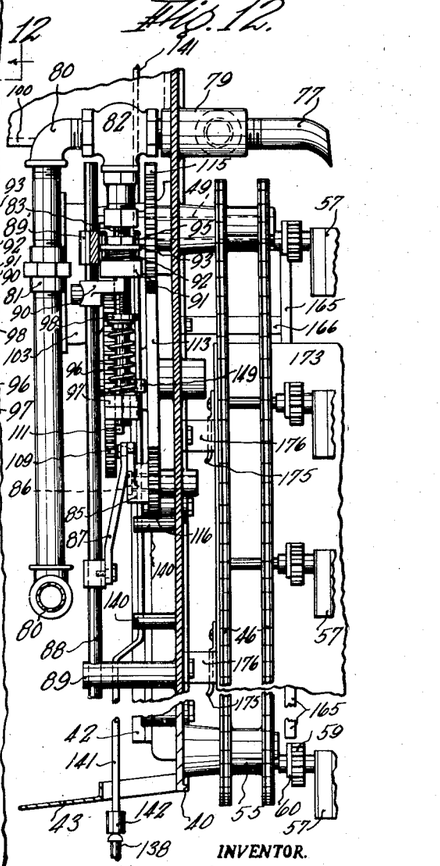
Fig. 12 is a fragmentary cross sectional view taken on the line 12—12 of Fig. 11.
Figures 13, 14, 15:
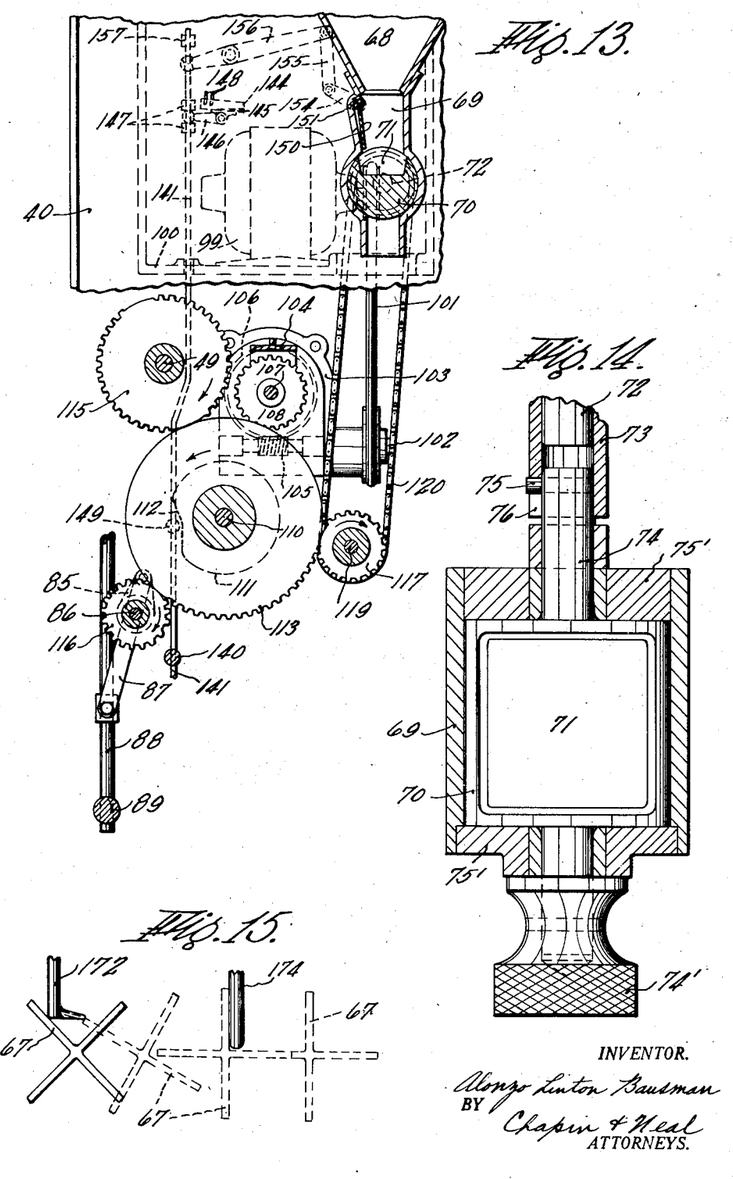
Fig. 13 is a sectional view taken on the line 13—13 of Fig. 10.
Fig. 14 is a sectional plan view taken on the line 14—14 of Fig. 13.
Fig. 15 is a diagrammatical view, illustrating the operation of the stirring devices in the coffee cups.

Referring now to the driving mechanism, this is all located on the back side of plate 40, as shown in Figs. 10, 11, 12 and 13. The power source is conveniently an electric motor 99, which is mounted on a shelf 100, secured as indicated to plate 40. Motor 99 drives by a belt 101, a shaft 102, mounted in a gear casing 103, which is secured to a bracket 104 fixed on the rear face of plate 40. Within casing 103 and fixed to shaft 102 is a worm 105 which drives a worm gear 106, fixed to a shaft 107. The latter extends rearwardly out of casing 103 and has a bearing in plate 40, as shown in Fig. 10. Fixed to shaft 107, between the plate and casing, is a gear 108 which drives a gear 109, mounted to turn on a stud 110 fixed in plate 40. Fixed to gear 109 is a cam 111 which, except for a single recess 112, is a cylindrical surface. Also fixed to gear 109 is an intermittent gear 113 which, as best shown in Fig. 13, drives three pinions 115, 116 and 117. The pinion 115 is fixed to the driving shaft 49 which operates the coffee cup conveyer. The pinion 116 is fixed to the crank 85 which operates the plunger 83 of the hot water supply valve 82. The pinion 117 is fixed to a sprocket 118 and both are mounted to turn on a stud 119 fixed in plate 40. Sprocket 118 is connected by a chain 120 to the sprocket on shaft 72, which operates the measuring wheel 70.

The driving gear 113, turning in the direction of the arrow shown in Fig. 13, is so constructed as to effect during each complete rotation the following operations. First, pinion 117 is turned through one complete revolution and then comes to rest, whereby a measured charge of ground coffee bean is delivered into the uppermost cup 62 on the right hand vertical stretch of the conveyer. As soon as pinion 117 comes to rest, pinion 115 is started in motion and is turned one half revolution to advance the coffee cup conveyer one step. Pinion 115 then comes to rest and pinion 116 is turned one complete revolution, thereby effecting an opening and then a closing of valve 82, whereby hot water is discharged into the cups of each vertical stretch of the conveyer.

The made coffee is received, and stored when necessary, in a drawer 121 which is located just above the horizontal leg of the water storage chamber and is mounted to slide into and out of the tank 15, when door 44 is opened. This drawer is subdivided by a partition 122 into a large compartment 123 and into a small compartment 124. The part marked 125 is not a partition, as might appear from Fig. 16, but is merely a brace which connects the partition 122 to one side wall of the drawer. It does not extend to the bottom of the drawer as will be clear from Fig. 7. Draw off faucets 126 and 127, mounted on the front and outside wall of the drawer, communicate respectively, with the small and large compartments. In addition, a valve 128 (Fig. 16) is provided which when opened permits communication between the two compartments. This valve 128 can be operated from outside the apparatus by a handle 129. All that part of drawer 121 which lies forwardly of plate 40, is covered by a pan 130. This pan rests upon four lugs 131 fixed to the side walls of drawer 121 and the rear lugs project up in back of pan 130 to prevent it from sliding rearwardly. Pan 130 has an opening therein which overlies the small compartment 124 and in this opening is mounted a rectangular frame 132 which supports a screen 133. Resting on angles 134 secured to the side walls of pan 130 is a screen 135 which covers the entire area of the pan. It will be seen that all coffee dripping from the cups 62 will pass through screen 135; that some may pass directly into the small compartment 124; and that none can pass directly into the large compartment because of the pan 130, which diverts the coffee into the small compartment. That part of the drawer lying to the rear of plate 40 is protected from any foreign matter falling therein from the overlying mechanism by the pan 43 which, as above described, extends across from the lower edge of plate 40 to the rear wall of the tank and closely fits the same as well as the partitions 18 and 19.

Figure 12A:
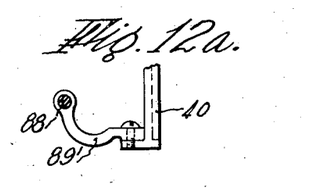
Fig. 12a is a sectional plan view of a detail shown in Fig. 12.

The motor 99, and thus the operation of the entire coffee making mechanism, is controlled automatically according to the level of made coffee in compartment 124. The rear end of such compartment contains a float 137, having an upstanding hollow stem 138, which slides on an upright guide pin 139 secured to the bottom wall of drawer 121. Slidably mounted in several guides 140 fixed to the rear wall of plate 40 is a rod 141 and adjustably fixed thereto near the lower end thereof is a member 142, the lower part of which overlies and is adapted to be engaged by the plunger 138 (Figs. 7 and 12). Rod 141 is adapted to operate a switch in the circuit to motor 99. This switch consists of a sealed glass tube 144 (Fig. 11) containing mercury 145. The tube is carried by an arm 146 pivoted to the back of plate 40. Arm 146 is forked to straddle rod 141 and engages with either of two collars 147 thereon. As shown, the tube 144 is so tipped that the two contacts 148 in tube 144 are disconnected, but when float 137 falls, the tube will be so tipped that the mercury will run to the opposite end thereof, thereby connecting the terminals 148 and starting the motor.

It is essential that the motor should not be stopped while the hot water supply valve 82 is open. To that end a roll 149 is fixed to rod 141 and so located that it will engage the periphery of cam 111 when the rod rises, or else ride into the cam recess 112. If the cam happens to be so positioned when rod 141 rises, that roll 149 can ride into the cam recess 112, then the rod can rise far enough to move the mercury switch to off position. Otherwise, roll 149 will strike the smooth cylindrical part of cam 111 and further rising movement of rod 144, such as is necessary in order to operate the switch, will be prevented until the driving mechanism comes to the desired position in its cycle (being that shown in Fig. 13) when recess 112 allows the rod 141 to rise far enough to open the mercury switch. The motor 99 can thus be stopped only when the parts are positioned as shown in Fig. 13. As there shown, the coffee cup conveyer is at rest, the hot water valve 82 is closed and the feeding and measuring wheel 70 is in position to be filled with ground coffee bean.

It is also desirable to stop the operation of the machine when the supply of ground coffee bean in hopper 68 is exhausted. To this end, a flap valve 150 (Fig. 13) is mounted in the outlet 69 of the hopper above the measuring wheel. This valve is fixed to a shaft 151 mounted to turn in the walls of outlet 69. Shaft 151 is coupled by a sleeve 152 (Fig. 10) to an alined shaft 153, which is mounted in plate 40 and on its rear end carries a lever 154. The sleeve connection permits convenient disconnection of the shafts 151 and 153 and allows the hopper to be removed. It is provided for the same reason as the bayonet joint connection between shafts 74 and 72. Lever 154 is connected by a link 155 to a lever 156. The latter is pivoted to plate 40 and has a forked end to straddle the float-operated rod 141, such end underlying a collar 157 on the rod. Normally the weight of the coffee will hold valve 150 open as shown, but when the supply of coffee runs low the valve will rise, due to the weight of the lever 154 and link 155 and part of the weight of lever 156, thereby raising rod 141 and tilting the mercury switch to off position. This arrangement, it will be noted, in no way interferes with the freedom of rod 141 to rise under the action of float 137.

For the purpose of cooling the motor, several openings 158 are provided in the rear wall of tank 15 just above shelf 100 and the cover 22 has an opening 159 (Fig. 2) overlying the motor. When the motor becomes warm a thermo-siphonic circulation of air is induced for cooling the motor. Such air enters the openings 158, passes along shelf 100 toward plate 40 and then rises, escaping through opening 159 in cover 22.

The several stirrers 65 are intermittently operated at two different times for two distinct purposes. First, they are operated during the coffee making operation at some suitable point in the cycle of travel of the cups, as for example, after they have completed their downward travel and before they start their upward travel. Second, the stirrers are again operated while their cups are inverted in order to loosen the coffee grounds and facilitate the emptying of the cup.

Figure 8:
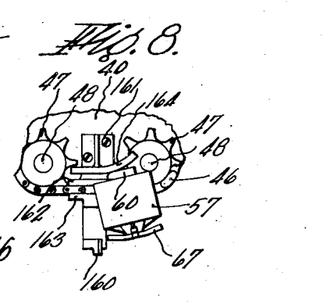
Fig. 8 is a fragmentary view, taken similarly to Fig. 7 and illustrative of the operation of the stirring devices.

For the first operation of the stirrers, as the cups successively pass along their lower horizontal path, one of the spokes of the wheel 67 engages a stationary arm 160 (Figs. 7, 8 and 10) which projects outwardly from a bracket 161 secured to plate 40 near the central bottom part thereof. This same bracket has formed thereon a short track 162, against which the upper side of the rear chain 46 bears; and a similar track 163, against which the under face of the front chain bears. These tracks, by thus engaging the chains, serve to maintain the spindles 53 on which the cups are turnably mounted, in horizontal position, whereby the axis of each cup is maintained vertical and the spokes of wheel 67 kept properly positioned for engagement with arm 160. Bracket 161 also carries another track 164, along which the plates 60 of the coffee cups successively slide. The engagement of each plate 60 with track 164 prevents its cup from rotating on its supporting spindle during the time that the spoked wheel is being turned by arm 160. The latter is arranged to effect a quarter turn of the stirrers.

In order to avoid tilting of the coffee cups 62 during their two courses of vertical travel, vertically disposed guide strips 165 are provided, as shown in Fig. 7, along which one vertical edge of each plate 60 slides. These guide strips may be supported from plate 40 in any suitable way, as by the brackets 166 shown in Fig. 10.

Each coffee cup, after it has completed its upward vertical course of travel and made the turn into its upper horizontal course of travel, is turned through one complete revolution during the last named course of travel. This is effected by a rack 167 which engages and turns the pinion 59 on the cup, as will be clear from Fig. 7. This rack is carried by a bracket 168 fixed to plate 40 (see also Fig. 10). Bracket 168 also carries a track 169, against which the under side of the front chain 46 is engaged. A separate bracket 170, fixed to plate 40, carries a track 171 to engage the upper face of the rear chain 46. These tracks 169 and 171 steady the chains and line up and hold the spindles 53 of the coffee cups in proper position so that the pinions 59 will be properly engaged with rack 167. The cups 62 are turning during all of their horizontal travel. As each cup is swung upwardly, one of the spokes of its wheel 67 is engaged by an arm 172, fixed to plate 40. The wheel 67

(see Fig. 6) will be turned approximately through one quarter of a revolution by arm 172 by the time the cup 62 reaches the illustrated position and becomes fully inverted. Thus, the scrapers 65, of which there are four, will have moved over the entire surface of cup 62 and loosened the grounds therefrom. The grounds fall from the cup into the open upper end of an underlying receptacle 173. As the cup continues to travel, another spoke of wheel 67 will be engaged by another arm 174, also fixed to plate 40. Arm 174 will cause wheel 67 and scrapers 65 to be turned another quarter revolution and this occurs while the cup 62 is so tilted as to empty into receptacle 173. The latter may be supported for convenient removal in any suitable manner. As shown in Fig. 12, there are two spring clips 175, fastened to the back wall of the receptacle, and these are engaged with, and supported by, straps 176 secured to plate 40.

In operation, cold water enters through the inlet 23 and fills the U-shaped storage chamber to a level above that of the water dispensing spouts 77 and 78, when inlet valve 24 closes. The float 25 operates this valve and automatically maintains the water at the desired level. The water in the storage chamber is heated by gas burner 32 and kept within close limits at the desired temperature through the action of the thermostatically controlled valve 34, which automatically starts and stops the burner according to requirements. It is to be noted that the storage chamber surrounds the storage drawer 121 on three sides and the hot water in such chamber assists in keeping the made coffee in the drawer hot. The flues 37 and 37' also assist in the action just described by keeping warm the chamber which is located above the storage drawer and in which the coffee making mechanism is housed. After the water is heated by its travel through the U-shaped storage chamber, and principally as it passes over the burner 32, it is fed from the chamber whenever required, through piping 80 under the automatic control of valve 82, and into the dispensing spouts 77 and 78. From these spouts, hot water is discharged into both the left hand and the right hand vertical series of cups on conveyer 46.

As the hot water passes through each cup 62 and drips into the underlying cup, it leaches the ground coffee bean and gradually becomes stronger and stronger coffee until it finally passes through the bottom cup of the vertical series and into the storage drawer 121 as made coffee. From the drawer, hot coffee may be drawn, as needed, through the faucets 126 or 127.

It will be apparent that, if hot water is kept running (with only necessary interruptions as will appear) through cups 62 and the supply of ground coffee in the cups is renewed often enough, there will be a continuous making of coffee. The machine is so designed as by having a series of cups move both against and with falling streams of hot water to make coffee in a substantially continuous manner, whenever desired, or in an intermittent manner. One preferred arrangement for the machine would be to have the whole quantity of coffee made in a continuous operation over a given time equal the amount of coffee that would run out of the faucet 126 (or when a larger capacity is required, both faucets 126 and 127) while wide open for an equal time. In such case, no made coffee would be stored in the machine while in full operation. This possibility will emphasize the general goal to which the operation of the machine is approximated and the various features of invention are related for adjustment to meet practical conditions leading to such possibility.

The operation of the coffee making mechanism is controlled according to the demand, as manifested by the frequency and the amount of withdrawals of coffee from storage drawer 121. Whenever the supply of stored coffee runs low, float 137 will fall and with it rod 141 and the latter, in falling, will tip the mercury switch 144 and cause motor 99 to be started in operation. The coffee making mechanism will thus be set in operation and it will thereafter continue through successive cycles of operation until the supply of made coffee in drawer 121 is replenished. The float 137 then rises and lifts rod 141 and the mechanism will be stopped, when it reaches the end of its cycle of operations. It will not be stopped at any other point in such cycle because the rising movement of rod 141 will be arrested by the engagement of roll 149 with the cylindrical part of cam 111 and it is only when this cam arrives at the illustrated position that rod 141 can rise far enough to tip the switch 144 to off position.

Each cycle of operation of the coffee making mechanism effects the following results. First, the control gear 113 will turn gear 117 through one complete revolution while the coffee cup conveyer is at rest and the water valve 82 is closed. This will turn the feeding and measuring wheel 70 through one revolution from the position illustrated in Fig. 13. Thus, the pocket 71 which has been previously filled with ground coffee bean from hopper 68, will be turned so as to discharge the measured charge into the underlying cup 62,—being the uppermost cup of the right hand vertical series. The wheel 70 will then return to its illustrated position and come to rest. Its pocket 71 will then be filled with ground coffee bean from the hopper. Second, the control gear 113 will turn gear 115 through one half revolution and thus advance the chains 46 of the coffee cup conveyer. Incidental to the movement of the conveyer, the stirrers 65 in one of the cups 62, are operated by the arm 160 to stir up the ground coffee bean in the cup, while in motion and at an intermediate point in its travel between filling and discharge position. Also, another cup will be inverted as it moves into overlying relation with receptacle 173 by means of the rack 167, which effects one revolution of the gear 59 on the cup. During this inversion of the cup, the stirrers 65 are operated, first by the arm 172 and then by arm 174, to loosen the grounds in the cup and assist in securing a complete emptying of the cup. Third, after the coffee cup conveyer comes to rest, the control gear 113 will impart one complete revolution to gear 116 and thus to crank 85, whereby rod 88 is reciprocated to first open and then close the water valve 82. This results in measured charges of hot water issuing from spouts 77 and 78 and thus into the cups on both vertical stretches of conveyer 46. Since the level of water in the storage chamber is maintained substantially at a constant level and the time during which valve 82 is open is a constant, it follows that the amount of water delivered from spouts 77 and 78 will be constant at each operation of the machine. The quantity of water admitted may be varied by varying the time, in the cycle of operation of crank 85, during which the valve 82 is open. The arm 90 is adjustably secured to rod 88 to enable such time to be varied, and the abutments 93 and 97 are adjustable on the rod and their position can be varied, if necessary, to secure the desired result.

It is thought important that water be admitted to the cups of both vertical series, although the invention is not limited thereto and has been practiced in a form where only one vertical series of cups is used for making coffee. For the desired result, a certain amount of hot water must pass through a certain amount of ground coffee bean in a given time. In the preferred form of the invention, half this amount is delivered to the cups 62 at one point in the travel of the conveyer 46 and the other half to the cups at another point in such travel. By so doing, a smaller charge of water is fed at any one time to the cups and there is less likelihood of the cups flooding over than when the total charge of water is delivered at one time to one cup. Also, the arrangement admits of a more efficient utilization of the conveyer, each of the four stretches of which is utilized for some necessary purpose and the larger part of the travel of which is utilized for the making of coffee, with only such necessary interruptions as occur for the stirring of the ground coffee bean and the emptying of the spent grounds.

From the foregoing description, it will be clear that coffee is effectively and automatically made according to the demand, as manifested by withdrawals from storage drawer 121. However, the mechanism does not operate every time a cup of coffee is drawn from the machine through valve 126 because a small quantity is stored in the compartment 124 and the float 137 must fall a definite distance before the mechanism is started.

In order to vary the quantity of coffee stored in drawer 121, the small and large compartments 124 and 123, respectively, have been provided. When the demand for coffee is large, valve 128 is opened to connect the two compartments and increase the storage space. When the larger storage space is used to meet a heavier demand, two service faucets 126 and 127 are available, where only one,—the faucet 126,—was available for the lighter demand when compartment 124 alone was used to store the coffee.

With this arrangement, a most satisfactory balance between coffee supply and demand and storage capacity may be attained. During dull periods of the day, as between rush hours in a restaurant, the small compartment 124 and its faucet 126 alone are used and, since little coffee is then demanded, that little is normally freshly made because of the small storage capacity. During rush hours, both storage compartments are used and both faucets may be used and the mechanism will naturally be working often enough to keep the coffee freshly made. All the attendant needs to do is to see that the machine is supplied often enough with fresh ground coffee bean in hopper 68 and that receptacle 173 is emptied when required. Should the supply in hopper 68 become exhausted, the switch 144 will be held in open position by the rising movement of flap valve 150 and the mechanism cannot be operated until the coffee supply is replenished.

One of the features of the machine is the arrangement by which all of the coffee making mechanism is carried on plate 40 for insertion into, or removal from, the tank 15 as a unit. By taking off the cover 21, disconnecting union 81 and removing the six cap screws 41 (through the opening available when door 44 is opened), this plate with all moving parts of the machine in assembled relation thereon, may be lifted vertically out of the machine. Access for disconnection of union 81 may be had by way of a door in the back of the casing, which door is indicated in part at 178 in Fig. 10. The measuring wheel 70 should be removed prior to removal of plate 40, and shafts 151 and 153 should be disconnected at sleeve 152. The hopper 68 and casing 69 will then be removed with cover 21, while the shafts 72 and 153 remain with plate 40. Float 25 and its valve seldom need attention but they are readily accessible when cover 21 is removed. It is of considerable manufacturing advantage to be able to assemble all parts of the coffee mechanism outside the limited confines of tank 15. The entire mechanism may be assembled and adjusted and then inserted as one unit in the tank. So also, if servicing is required, the plate 40, with all the mechanism thereon may be quickly removed and another unit substituted, after which the removed unit may be taken to a shop where it may conveniently be put in order.

The ready removability of the storage drawer 121 enables it to be easily, quickly and thoroughly cleaned without disturbing the mechanism of the machine,—a most important feature where containers of liquid coffee are concerned. In removing this drawer, it is desirable to shut off the electrical supply because rod 141 will drop to switch closing position, when unsupported by float 137. When reinserting the drawer, it is advisable to reach in through door 44, which would then be open, and raise rod 141 while the float stem 138 is slid into place.

The coffee making machine, with the features described, is particularly useful in public eating places. The invention is pointed out in the appended claims which are intended to cover the various features in different combinations as comprehensively as the state of the prior art makes possible.

What I claim is:

1. In a coffee making apparatus or the like, mechanism to make coffee comprising a conveyer, a series of porous cups spaced on the conveyer and hung to normally remain upright, means to stir the contents of said cups, means to feed ground coffee bean to the cups, means to turn the cups for emptying the coffee grounds, means to drop hot water through one cup to another, and means to operate said stirring means to loosen the coffee bean in the cups.

2. In a coffee making apparatus or the like, mechanism to make coffee comprising a conveyer having two vertical flights, a series of porous cups on said conveyer, each pivoted to normally remain upright, means to drop hot water through one cup to another in one vertical flight of the conveyer, means to feed ground coffee bean to said cups before and to empty spent grounds therefrom after the cups pass through said vertical flight of the conveyer, and means to loosen the coffee grounds or bean while in said cups.

3. In a coffee making apparatus or the like, mechanism to make coffee comprising a conveyer, a series of porous cups pivoted to hang upright on said conveyer, a stirrer in each cup with an operable extension means to turn the same, means to drop hot water through one cup to another in said flight, means to feed ground coffee bean to said cups, means to empty spent grounds from said cups, means to operate said extension means as the cup is being emptied, and means to operate said extension means as each cup reaches a point in its travel intermediate the feeding and emptying points.

4. In a coffee making apparatus or the like, mechanism to make coffee comprising a conveyer arranged in a vertical loop, a series of porous cups spaced on the conveyer, a measuring device for ground coffee bean, a container for spent grounds, and a hot water feeding device all located adjacent said loop; timed means operable to intermittently drop water in line with a vertical flight when the conveyer is stationary and to feed ground coffee bean during such time, and means operable upon the movement of the conveyer to stir the material in said cups and empty one of them.

5. In coffee making apparatus, a conveyer having a vertical path, a series of porous cups carried by the conveyer one below the other and adapted to contain ground coffee bean, means to move the conveyer, means to drop hot water in an upper cup, and means to stir the material in said cups to assist the water to drop therethrough.

6. A coffee making machine, comprising a U-shaped tank for a hot water supply, means to heat the water at the horizontal portion of the tank, water inlet and outlet in opposite legs of the tank, and mechanism for making coffee located between the legs of the tank.

7. In a coffee making apparatus, a main tank having inner walls spaced from the outer walls and the bottom wall to carry a hot water supply, coffee making power mechanism located between the inner walls, a made coffee receptacle just above the inner bottom wall, and means controlled by the liquid level in said receptacle to start and stop said power mechanism.

8. In a coffee making apparatus, a main tank having inner walls spaced from the outer walls and the bottom wall to carry a hot water supply, coffee making mechanism located between the inner walls, a made coffee receptacle just above the inner bottom wall, means controlled by the liquid level in said receptacle to start and stop said making mechanism, and means operable by said mechanism to feed hot water and coffee beans in quantities measured in proportion to the time said mechanism is in operation.

9. A coffee making apparatus, comprising a tank divided into compartments, one for the hot water supply, one for coffee making mechanism, and one for the made coffee situated below that for said mechanism, said tank having an opening for the insertion and removal of said mechanism from the top and an opening in the side for the insertion and removal of a container forming the walls of the made coffee compartment.

10. In a coffee making apparatus, a tank divided into compartments for the storage of hot water and for the reception of operating mechanism, a frame adapted to be inserted into and removed from one of said compartments; mechanism on said frame including means to intermittently measure quantities of ground coffee bean, a series of receptacles having porous bottoms to successively receive said quantities of coffee, means to move said receptacles through a closed cycle of movements including a vertical path, means to release measured quantities of hot water from said storage compartment at a point above and in line with said vertical path, and means to empty each receptacle of coffee grounds after it moves away from said vertical path; said frame and mechanism being insertable into and removable from its compartment as a unit, a made coffee receptacle under said vertical path, and means to withdraw coffee from said receptacle.

11. In a coffee making apparatus, a tank divided into compartments for the storage of hot water and for the reception of operating mechanism, a frame adapted to be inserted and removed from one of said compartments; mechanism on said frame including means to intermittently measure quantities of ground coffee bean, a series of receptacles having porous bottoms to successively receive said quantities of coffee, means to move said receptacles through a closed cycle of movements including a vertical path, means to release measured quantities of hot water from said storage compartment at a point above and in line with said vertical path, and means to empty each receptacle of coffee grounds after it moves away from said vertical path; said frame and mechanism being insertable into and removable from its compartment as a unit, a made coffee receptacle under said vertical path, a float controlled means operable by the liquid level in said receptacle to stop and start said mechanism, and means to withdraw coffee from said receptacle.

12. An automatic coffee making machine, comprising a tank, partition walls in the tank to form a U-shaped water storage chamber, and a dry space between the legs of such storage chamber to receive the mechanism of the machine, an inlet to the storage chamber near the top of one of its legs and an outlet from the chamber in the other leg, means for heating the water at the bottom of the storage chamber, and mechanism within said dry space operable to make coffee as water is fed to it from the storage chamber, said mechanism having means to control the feed of water from the storage space to the mechanism in direct proportion to the operation of the latter.

13. A coffee making apparatus, including mechanism to make the coffee, comprising, an endless conveyer with a long vertical flight, open ended receptacles with sieve bottoms hung in spaced relation on the conveyer so as to normally stand upright throughout their travel, a storage container for ground coffee arranged for each receptacle to pass beneath it, a measuring means for said container, a storage means for spent coffee grounds arranged for each receptacle to pass over its open end, means operable to empty each receptacle as it passes the storage means, a water feeding device operable to feed water to a top receptacle in line with the vertical flight of the conveyer; a gear train constructed to drive and time in a fixed sequence the conveyer, the coffee measuring means, the water feeding means, and the receptacle emptying means; a motor to drive said gear train, and means to start and stop said motor in accordance with the amount of made coffee in said apparatus.

14. A coffee making apparatus, including mechanism to make the coffee, comprising, an endless conveyer with a long vertical flight, open ended receptacles with sieve bottoms hung in spaced relation on the conveyer so as to normally stand upright throughout their travel, a storage container for ground coffee, a measuring means for said container arranged to successively supply said receptacles, a storage means for spent coffee grounds arranged for each receptacle to discharge therein, means operable to empty each receptacle as it passes the storage means, a water feeding device operable to feed water to a top receptacle in line with the vertical flight of the conveyer; and a gear train constructed to drive and time in a fixed sequence the conveyer, the coffee measuring means, the water feeding means, and the receptacle emptying means.

15. In a coffee making apparatus, a tank divided into compartments for the storage of hot water and for the reception of operating mechanism, a frame adapted to be inserted and removed from one of said compartments, mechanism on said frame to intermittently measure quantities of ground coffee bean, a series of receptacles having porous bottoms to successively receive said quantities of coffee, means to move said receptacles through a closed cycle of movements including a vertical path, means to release measured quantities of hot water from said storage compartment at a point above and in line with said vertical path, and means to empty each receptacle of coffee grounds after it moves away from said vertical path, said frame and mechanism being insertable into and removable from its compartment as a unit.

16. In a coffee making apparatus, a main tank having inner walls spaced from the outer walls and the bottom wall to carry a hot water supply, coffee making power mechanism located between the inner walls, a made coffee receptacle just above the inner wall, means controlled by the liquid level in said receptacle to start and stop said mechanism, and means operable by said power mechanism to feed hot water and coffee beans in quantities measured in proportion to the time said mechanism is in operation.

17. In a coffee making apparatus, a tank for storing hot water and made coffee and provided with a dry compartment for mechanism, and automatic coffee making mechanism within the dry compartment of the tank; said mechanism comprising a vertical frame plate, a horizontal shelf thereon, a gear train on one side of the vertical plate, and a conveyer with spaced containers, a ground coffee receptacle with measuring mechanism for supplying said containers, a receptacle for receiving spent coffee from the containers all arranged in cooperative relation on the other side of the plate, a motor on said shelf for operating the gear train, said conveyer and measuring means being operable in timed relation by the gear train, and a hot water feeding device also operated by said gear train; said frame carrying said mechanism as a unit for insertion in and removal from said tank.

18. In a coffee making apparatus, a tank having compartments, one for the hot water, one for the mechanism to make the coffee, and one for the made coffee, and means to heat the water and maintain the temperature of the made coffee, means operable upon a changing liquid level of made coffee to start and stop said mechanism, said compartment for the made coffee being divided into a plurality of compartments having a valved connection one to the other, and a service outlet for at least one of such compartments, said starting and stopping means being located so as to operate from the level of only one compartment or all compartments of the last named compartments depending on whether their connection is opened or closed.

19. A coffee making apparatus, comprising, a tank divided into compartments, one for hot water storage, one for coffee making mechanism, and one for made coffee, means to heat the water, automatic means to maintain a constant level of hot water, mechanism to automatically make the coffee, a frame for said mechanism by which it may be inserted and removed to and from its compartment as a unit above the made coffee compartment, said mechanism having means to control a hot water feed from the storage compartment as used by the mechanism, and a liquid level control means in the made coffee compartment for starting and stopping said mechanism.

20. In an apparatus for making coffee or the like, a conveyer having two vertical flights, a series of porous supports for ground coffee bean movable with the conveyer, means for successively placing coffee bean on said supports near the start of the travel of each in one of said flights, means for dropping hot water successively through the supports while moving in both said vertical flights to leach the coffee bean thereon, and means for successively removing the coffee bean from the supports near the end of the travel of each in the other of said vertical flights.

21. In an apparatus for making coffee or the like, a conveyer having two relatively long and substantially vertical flights and two relatively short and substantially horizontal connecting flights, a series of porous cups on said conveyer, each pivoted to normally remain upright, means to drop hot water through one cup to another in both said vertical flights, means to feed ground coffee bean to said cups while near the start of one of said vertical flights, means to stir the bean in said cups while the latter pass in one of said horizontal flights from the last named to the other vertical flight, and means to empty the spent grounds from each cup while it travels in the other horizontal flight.

22. In an apparatus for making coffee and the like, a conveyer having two relatively long and substantially vertical flights and two relatively short and substantially horizontal flights, a series of porous cups on said conveyer each pivoted to normally hang upright, means to drop hot water from one cup to another during the travel of the cups in both said vertical flights, means to feed ground coffee bean to each cup near the start of its vertically downward flight, means to stir the bean in each cup during its lower horizontal flight, and means to empty the cups during their upper horizontal travel.

23. In an apparatus for making coffee and the like, a conveyer having two relatively long and substantially vertical flights and two relatively short and substantially horizontal flights, a series of porous cups on said conveyer each pivoted to normally hang upright, means to drop hot water from one cup to another during the travel of the cups in both said vertical flights, means to feed ground coffee bean to each cup near the start of its vertically downward flight, means to stir the bean in each cup during its lower horizontal flight, means to empty the cups during their upper horizontal travel, and a receptacle mounted within the loop of said conveyer and having an open top to receive the spent grounds emptied from said cups.

24. In an appartus for making coffee or the like, a conveyer having two relatively long and substantially vertical flights and two relatively short and substantially horizontal connecting flights, a series of porous cups on said conveyer, each pivoted to normally remain upright, means to drop hot water through one cup to another in both said vertical flights, means to feed ground coffee bean to said cups while near the start of one of said vertical flights, means to stir the bean in said cups while the latter pass in one of said horizontal flights from the last named to the other vertical flight, means to rotate the cups and empty the spent grounds therefrom as they pass through the other horizontal flight, and means for preventing pivotal movement of the cups during their travel through all except the last named of said flights.

25. In an apparatus for making coffee and the like, a conveyer comprising two laterally spaced chains with a series of spindles interconnecting them at longitudinally spaced intervals and projecting therebeyond, a series of porous cups pivotally supported on said spindles, a stirrer in each cup with an operable extension means to turn the same, means to operate each extension as its cup passes through one part of the travel of said conveyer, and means engageable with the chains of said conveyer during said part of its travel to hold them in a fixed path and align the spindle of each cup so that its extension means will properly engage said turning means.

26. In an apparatus for making coffee and the like, a conveyer comprising two laterally spaced chains with a series of spindles interconnecting them at longitudinally spaced intervals each of said spindles extending between the chains and having a portion projecting beyond one of the chains, a series of porous cups pivotally supported one on each of the projecting portions of said spindles, a gear fixed to each cup, and a rack supported adjacent one part of the path of travel of the conveyer in position to successively engage and turn said gears, whereby the cups are rotated on their spindles and inverted to empty the spent grounds therefrom.

27. In an apparatus for making coffee and the like, a conveyer comprising two laterally spaced chains with a series of spindles interconnecting them at longitudinally spaced intervals, each of said spindles extending between the chains and having a portion projecting beyond one of the chains, a series of porous cups pivotally supported one on each of the projecting portions of said spindles, a gear fixed to each cup, a rack supported adjacent one part of the path of travel of the conveyer in position to successively engage and turn said gears, whereby the cups are rotated on their spindles and inverted to empty the spent grounds therefrom, and means engageable with said chains during said part of the travel to successively line up each gear for proper engagement with said rack.

28. A coffee making apparatus, comprising, a tank divided into compartments, one for hot water storage, one for coffee making mechanism, and one for made coffee, automatic means to heat the water and maintain it at a predetermined temperature, automatic means to maintain a constant level of hot water, mechanism to automatically make the coffee, a frame for said mechanism by which it may be inserted and removed to and from its compartment as a unit above the made coffee compartment, said mechanism having means to control a hot water feed from the storage compartment as used by the mechanism, and a liquid level control means in the made coffee compartment for starting and stopping said mechanism.

29. In a coffee making apparatus, a tank divided into compartments for the storage of hot water and for the reception of operating mechanism, a frame adapted to be inserted into or removed from one of said compartments, a cover for the tank supporting a hopper for ground coffee bean, said hopper including a measuring wheel removably mounted therein, a drive shaft mounted in said frame and having a detachable connection with the measuring wheel, whereby by a turn of said wheel and an axial pull thereon it may be detached from said shaft and withdrawn from said hopper.

30. A coffee making apparatus, comprising a U-shaped tank for a hot water supply, a burner below the horizontal portion of the tank, water inlet and outlet connections to the tank, flues passing through the vertical legs of the tank to conduct the gases away from said burner, and coffee making mechanism located between said legs of the tank.

31. In a coffee making apparatus, a main tank having inner walls spaced from the outer walls and the bottom wall to carry a hot water supply, coffee making power mechanism located between the inner walls, a made coffee receptacle just above the inner bottom wall, and means controlled by the liquid level in said receptacle to start and stop said power mechanism, said mechanism including a hopper for the coffee bean and measuring means to feed the bean, and means operable when the supply of bean in said hopper falls low to stop the operation of said power mechanism.

32. In a coffee making apparatus, a main tank having inner walls spaced from the outer walls and the bottom wall to carry a hot water supply, coffee making power mechanism located between the inner walls, a made coffee receptacle just above the inner bottom wall, a burner below the outer bottom wall, and flues extending through said outer and inner bottom walls and upwardly through the space in which said receptacle and mechanism is located to conduct the gases away from said burner and utilize the heat from such gases in warming the space between said inner walls.

In testimony whereof I have affixed my signature.

ALONZO LINTON BAUSMAN.